United States Patent [19]

Reed

[11] Patent Number: 4,837,972
[45] Date of Patent: Jun. 13, 1989

[54] STRAIGHT-HANGING TAPERED PLANT POT

[76] Inventor: Edward W. Reed, 537 Calle Grande Cir., Santa Maria, Calif. 93455

[21] Appl. No.: 224,364

[22] Filed: Jul. 26, 1988

[51] Int. Cl.$^4$ .............................................. A01G 9/02
[52] U.S. Cl. ...................................................... 47/67
[58] Field of Search .................. 47/66, 67, 68, 39, 40, 47/71, 72, 80, 81; D11/143, 148, 152; D6/556

[56] References Cited

U.S. PATENT DOCUMENTS

| | | | |
|---|---|---|---|
| 289,102 | 11/1883 | Holden | D11/152 X |
| 2,884,741 | 8/1956 | Lange | 47/72 |
| 4,102,080 | 7/1978 | Kojo | 47/67 |

Primary Examiner—Robert A. Hafer
Assistant Examiner—Lynda M. Cofsky
Attorney, Agent, or Firm—Marvin E. Jacobs

[57] ABSTRACT

A straight-hanging tapered plant pot which includes a body composed of a side wall being tapered from a larger size at an upper end to a smaller size at a lower end and of a bottom wall connected to the side wall at the lower end thereof, has a hollow wedge-shaped projection integrally connected with, and bridging an interrupted section of, the pot side wall. The projection projects outwardly from the body side wall so as to adapt the projection to support the pot body in an upright, non-tilted fashion from a vertical surface and position the pot bottom wall in a generally horizontal plane. The hollow configuration of the projection and tapered configuration of the pot body allow a plurality of the pot bodies with projections thereon to be compactly stacked together in nested relationship.

18 Claims, 3 Drawing Sheets

STRAIGHT-HANGING TAPERED PLANT POT

BACKGROUND OF THE INVENTION

The present invention relates generally to hanging plant pots and, more particularly, is concerned with a tapered plant pot having a hollow wedge-shaped projection on a side for hanging the pot upright in nontitled fashion from a vertical surface.

Conventional conical or tapered plastic and ceramic plant pots tend to hang at an angle when mounted from vertical support posts and walls by plant pot brackets. The pots also tend to slip out of brackets which engage their upper rims. A pot hanging in a tilted fashion will not retain as much water in its tipped bottom tray as will an upright pot in its horizontal bottom tray. Also, the tilted pot is less attractive aesthetically than a pot that is maintained in an upright orientation.

One approach in the prior patent art to hanging a plant pot upright is to make it semi-circular with a flat tranversely-extending vertical side. An aperture is then provided in an upper extension of the flat side through which a fastener is used to attached the pot upright to the vertical surface. Representative of prior art pots of such design are the ones disclosed in a Danish Patent to Sejer-Keramik (60,951) and U.S. Patents to Thompson et al (1,683,271) and Kojo (4,102,080 and 4,137,668). However, this approach is not adaptable to commercially available, mass-produced pots and is unattractive to many consumers in that it compromises the desired full rounded, conical or tapered design of traditional plant pots.

Consequently, a need exists for improvements in plant pot design which will allow reliable mounting thereof in an upright orientation for use by commercial nurseries expanding applicability and sales.

SUMMARY OF THE INVENTION

The present invention provides a straight-hanging tapered plant pot designed to satisfy the aforementioned needs. The plant pot of the present invention has a body composed of a side wall tapered from a larger size at an upper end to a smaller size at a lower end, and a bottom wall connected to the side wall at the lower end thereof. The pot also includes a hollow mounting structure connected to the side wall at a side of the body and projecting outwardly therefrom so as to define a substantially flat surface disposed outside of the perimeter of the side wall and being adapted to rest against a generally vertical surface for supporting the body in an upright, non-tilted fashion from the vertical surface and positioning the bottom wall of the body in a generally horizontal plane.

More particularly, the side wall of the pot contains an interrupted section extending along a generally vertically-extending narrow region thereof at the side of the pot body. The hollow mounting structure is in the form of a hollow projection integrally connected with and bridging the interrupted section of the side wall. The hollow projection includes a rear planar section defining the vertical flat surface, and a pair of opposite side sections extending between and interconnecting the side wall of the pot body and the rear planar section along opposite edges thereof.

The rear section of the hollow projection has an aperture defined therethrough at an upper portion thereof for receiving a fastener for securing the pot at the projection to the vertical surface. Further, the hollow projection also includes a bottom section connecting the bottom wall of the pot body and the side and rear sections of the projection. Each of the rear, side and bottom sections has a tapered configuration. The hollow configuration of the projection and tapered configuration of the pot body allow a plurality of the pot bodies with projections thereon to be compactly stacked together in nested relationship.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
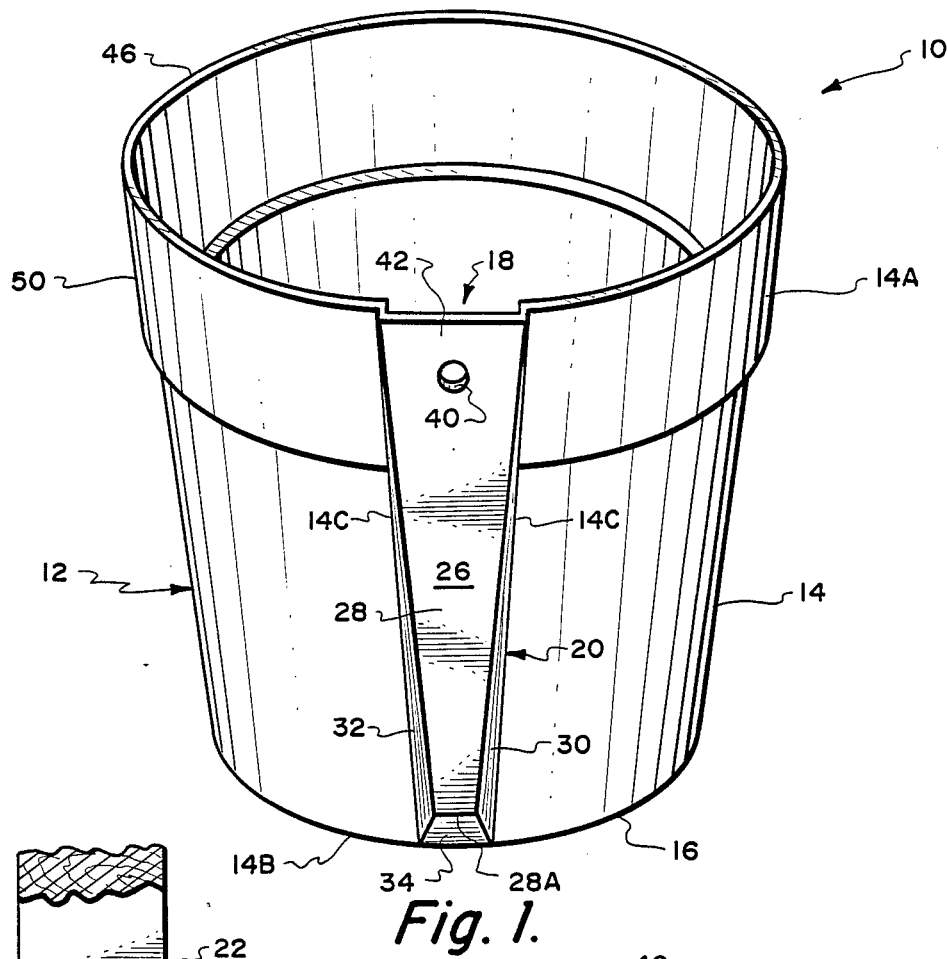
FIG. 1 is a perspective view of the straighthanging plant pot of the present invention.
Figure 2:
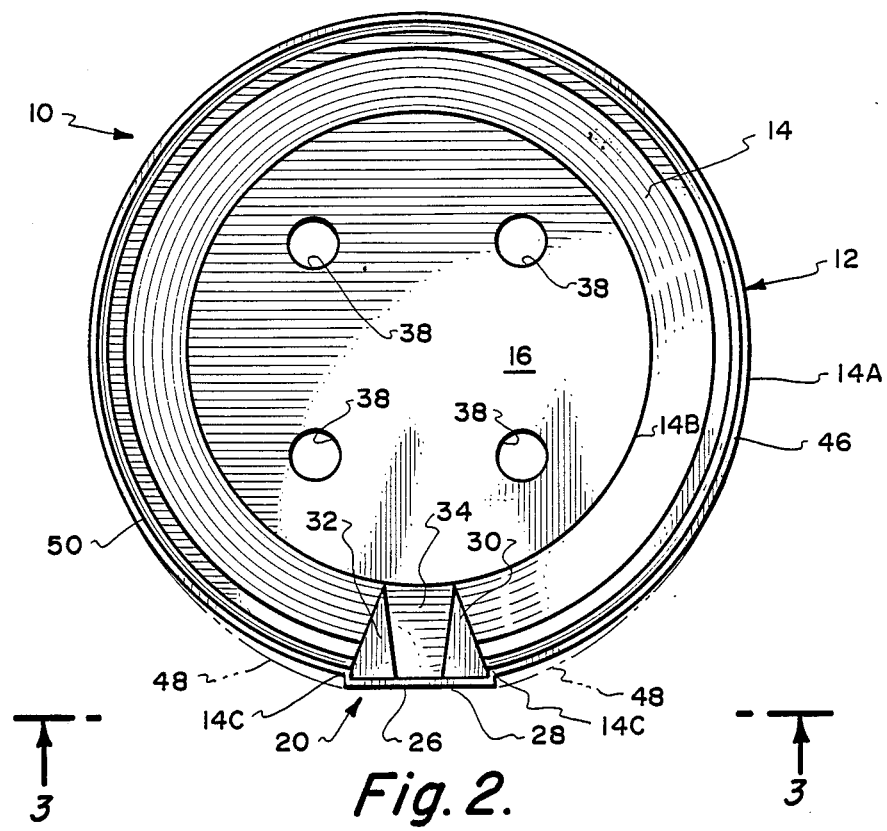
FIG. 2 is a top plan view of the pot of FIG. 1.
Figure 3:
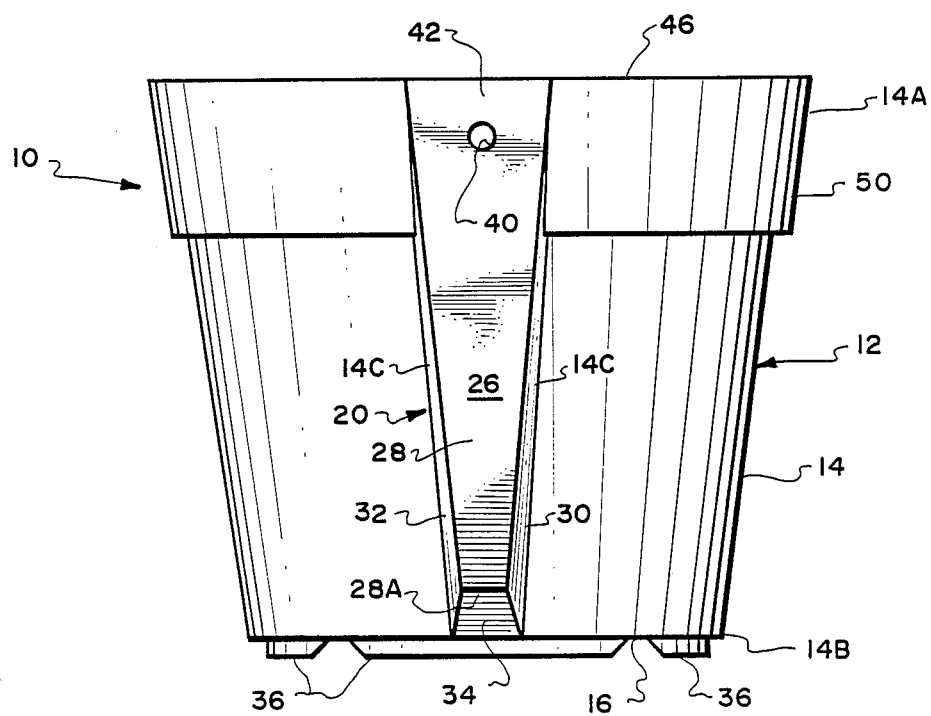
FIG. 3 is a side elevational view of the pot as seen along line 3—3 of FIG. 2.

Referring now to the drawings, and particularly to FIGS. 1 to 3, there is shown a straight-hanging tapered plant pot, being indicated generally by the numeral 10 and constructed in accordance with the principles of the present invention. The plant pot 10 has a body 12 composed by a side wall 14 and an integrally-connected bottom wall 16. The side wall 14, preferably conical in shape, is tapered from a larger size or diameter at an upper end 14A to a smaller size or diameter at a lower end 14B. The bottom wall 16 is connected to the side wall 14 at the lower end 14B thereof. The side wall 14 extends for about 335 degrees, being interrupted at one side along a narrow section or region 18 extending horizontally through an arc of approximately 25 degrees and vertically from the upper to lower side wall ends 14A, 14B.

Figure 4:
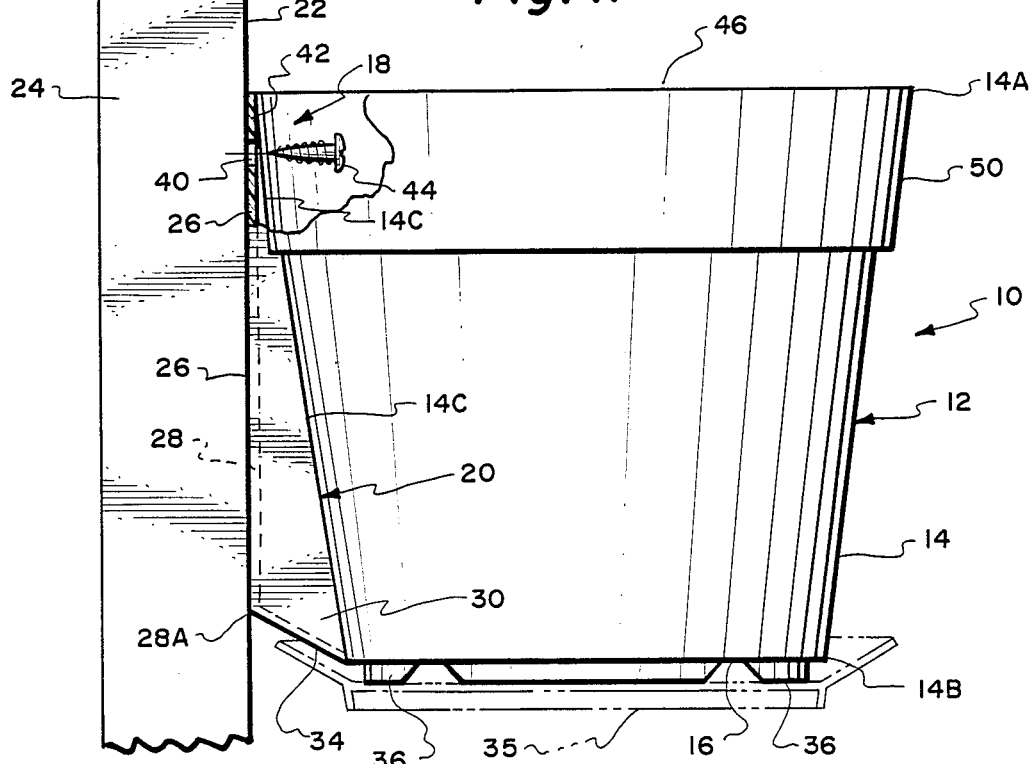
FIG. 4 is a side elevational view, with portions broken away and sectioned, of the pot hanging in an upright orientation from a vertical post.

The plant pot 10 also includes a hollow mounting structure 10 in the form of a hollow wedge-shaped projection being incorporated in accordance with the principles of the present invention at the interrupted region 18 of the side wall 14. The projection 20 is adapted for supporting the plant pot 12 from a generally vertical surface 22, such as of a support post 25 as seen in FIG. 4, in an upright nontiltd fashion with the bottom wall 16 of the pot 10 being disposed in a generally horizontal plane. Preferably, the projection 20 is integrally connected, such as by moulding, to the vertical edges 14C of the side wall 14 on either side of the interrupted region 18 such that the projection 20 bridges the region. Additionally, the projection 20 is entirely open vertically along and horizontally across the extent of the interrupted region and projects outwardly from the side of the side wall 14 so as to define a substantialy flat, generally vertical surface 26 disposed outside of the perimeter of the side wall and being adpated to rest against the vital surface 22 of the support post 24. The plant pot 10 is, therefore, supported continuously between the upper and lower edges 14A, 14B of its side wall 14 on the vertical surface 22 of the support post 24 by the flat surface 26 of the projection 20.

More particularly, the hollow projection 20 includes a rear planar section 28, defining the flat surface 26, a pair of opposite side sections 30, 32 extending in transverse relation between and interconnecting the pot side wall 14 at the opposite vertical edges 14C thereof with the rear planar section 28 along opposite edges thereof, and a bottom section 34 connecting the bottom wall 16 of the body 12 at the interrupted side wall region 18 with the rear, side and bottom sections 28-34 of the projection 20.

As clearly seen in FIGS. 1-3, each of the rear, side, and bottom sections 28-34 of the projection 20 has an elongated tapered configuration which imparts the overall tapered configuration to the projection 20. The projection 20 is preferably moulded integrally onto the pot body side and bottom walls 14, 16 at the side thereof at the time the body is moulded. Further, the rear planar section 28 has a length shorter than the vertical height of the pot side wall 14 so that its lower edge 28A is spaced above the elevation of the bottom wall 16 of the pot. The shorter rear section 28 together with the side and bottom sections 30-34 of the projection 20 provide a beveled configuration at the lower end of the projection adapting it to fit inside a bottom tray 35, as seen in dashed outline form in FIG. 4, when fitted over the underside of the bottom wall 16 of the body 10. It should be pointed out at this point that the plot 10 has a plurality of drain openings 38 in its bottom wall 16 and a plurality of projections 36 acting as a stand for the pot.

For hanging the plant pot 10 from the support post 24, as shown in FIGS. 1, 3 and 4 the rear section 28 of the projection 20 has an aperture 40 defined therethrough at an upper portion 42. The aperture 40 is sized to receive a fastener such as a screw 44 seen in FIG. 4 for fastening the projection 20 and thereby the port 10 to the vertical surface 22 of the post 24. In some pot constructions, there may be a tendency for the hanging pot 10 to bow out and become oval in shape. To avoid such deformation, during moulding of the pot 10 it is preferred to increase the thickness of the upper rim 46 of the side wall 14, as depicted by the dashed lines 48 extending in opposite directions from the opposite vertical edges of the rear section 28 of the projection 20 to about forty-five degrees around the rim 46. In such manner, the reinforced band 50 of the side wall 14 should gradually taper into the rim. Alternatively, desired shape of the pot 10 can be reinforced by using thicker resin or imbedding metal, fabric or fibrous reinforcement in the plastic.

Figure 5:
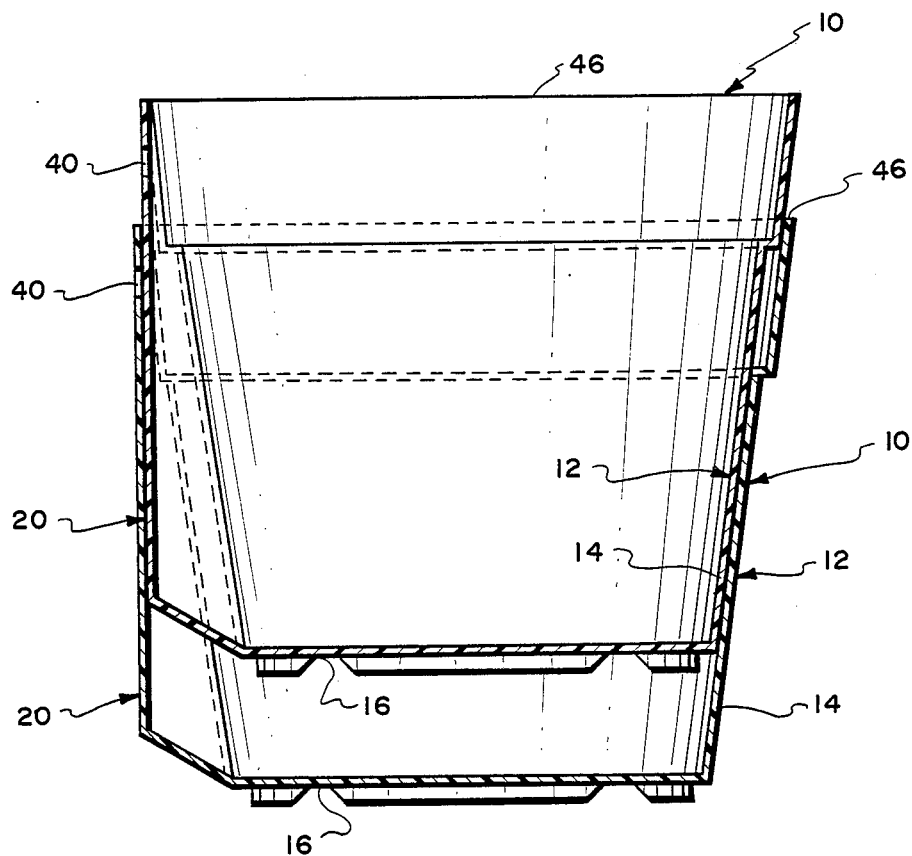
FIG. 5 is a vertical sectional view of a pair of the pots in upright orientation and illustrating their stackability in nested relation.

Turning to FIG. 5, it is seen that the hollow, inwardly open and tapered configuration of the projection 20 and the hollow tapered configuration of the generally conical body 12 of the port 10 allows a plurality of the pot bodies 12 with the hollow wedge-shaped projections 20 thereon to be compactly stacked together in nested relationship.

It is thought that the present invention and many of is attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

I claim:

1. A straight-hanging tapered plant pot, comprising:
    (a) a cylindrical pot having a body composed of a side wall said side wall being tapered to define a larger circumference at an upper end to a smaller circumference at a lower end, and a bottom wall correcting said side wall at said lowr end thereof, said side wall containing an interrupted section at a side of said body extending along a generally vertically-extending narrow region thereof; and
    (b) a hollow mounting structure connected to, and bridging said interrupted section of, said side wall at said side of said body, said structure being entirely open along and across said interrupted section of said side wall and projecting outwardly therefrom so as to define a substantially flat surface disposed outside of the circumference of said side wall and said substantially flat surface being perpendicular to said bottom wall and being adapted to rest against a generally vertical surface for supporting said body in an upright, non-tilted fashion from the vertical surface in which said bottom wall is disposed in a generally horizontal plane.

2. The plant pot of claim 1 wherein said body has an upper rim portion being thickened in the regions thereof which connect with an upper portion of said mounting structure.

3. The plant pot of claim 1 wherein said hollow mounting structure is in the form of a hollow projection.

4. The plant pot of claim 5 wherein said hollow projection includes:
    a rear plan section defining said flat surface and
    a pair of opposite side sections extending between and interconnecting said side wall of said body at said side thereof and said rear planar section along opposite edges thereof.

5. The plant pot of claim 4 wherein said rear section has an aperture defined therethrough at an upper portion thereof for receiving a fastener for fastening said mounting structure to the vertical surface.

6. The plant pot of claim 4 wherein said hollow projection also includes a bottom section connecting said bottom wall of said body at said side thereof and said side and rear sections of said projection.

7. The plant pot of claim 6 wherein each of said rear, side and bottom sections has a tapered configuration.

8. The plant pot of claim 1 wherein said hollow mounting structure has an aperture defined through said flat surface thereof at an upper portion of said structure for receiving a fastener for fastening said mounting structure to the vertical surface.

9. A straight-hanging plant pot, comprising:
    (a) a cylindrical pot having a body composed of a side wall said side wall being tapered to define a larger circumference at an upper end to a small circumference at a lower end and of a bottom wall connected to said side wall at said lower end thereof, said side wall having an interrupted section along a narrow generally vertically-extending region thereof; and
    (b) a hollow wedge-shaped projection integrally connected with, and bridging said interrupted section of, said side wall, said projection being entirely open relative to the interior of said body and projecting outwardly therefrom so as to define a substantially flat surface, said substantially flat surface being perpendicular to said bottom wall so as to adapt said body for hanging in an upright, non-tilted fashion in which said bottom wall is disposed in a generally horizontal plane.

10. The plant pot of claim 9 wherein said body is adapted to be continuously supported by said projection against the vertical surface.

11. The plant pot of claim 9 wherein said projection is moulded integrally onto said side wall and bottom wall of said body at said side thereof.

12. The plant pot of claim 9 wherein a lower end of said projection is beveled to fit inside a bottom tray when fitted on said bottom wall of the said body.

13. The plant pot of claim 9 wherein said hollow inwardly open configuration of said projection and tapered configuration of said body allow a plurality of said bodies with said projections thereon to be compactly stacked together in nested relationship.

14. The plant pot of claim 9 wherein said hollow projection includes:

a rear planar section defining said flat surface; and
a pair of opposite side sections extending between, in transverse relation to, and interconnecting said side wall of said body at said side thereof and said rear planar section along opposite edges thereof.

15. The plant pot of claim 14 wherein said rear section has an aperture defined therethrough at an upper portion thereof for receiving a fastener for fastening said mounting structure to the vertical surface.

16. The plant pot of claim 14 wherein said hollow projection also includes a bottom section connecting said bottom wall of said body at said thereof and said side and rear sections of said projection.

17. The plant pot of claim 16 wherein each of said rear, side and bottom sections has a tapered configuration.

18. The plant pot of claim 16 wherein rear, side and bottom sections of said projection at a lower end thereof together have a beveled configuration adapted to fit inside a bottom tray when fitted on said bottom wall of said body.

* * * * *